United States Patent [19]

Bonsignour et al.

[11] Patent Number: 5,877,950
[45] Date of Patent: Mar. 2, 1999

[54] DEVICE FOR MEASURING CURRENTS IN A CONVERTER

[75] Inventors: Eric Bonsignour, Carrieres sur Seine; Vinh T. Nguyen Phuoc, Boulogne Billancourt, both of France

[73] Assignee: Schneider Electric SA, Boulogne Billancourt, France

[21] Appl. No.: 938,950

[22] Filed: Sep. 9, 1997

[30] Foreign Application Priority Data

Sep. 9, 1996 [FR] France .................................. 96 11175

[51] Int. Cl.$^6$ .......................... H02M 7/44; H02M 7/5387
[52] U.S. Cl. .............................................. 363/98; 363/132
[58] Field of Search .................. 363/16, 17, 97, 363/98, 131, 132

[56] References Cited

U.S. PATENT DOCUMENTS

| | | | |
|---|---|---|---|
| 4,772,996 | 9/1988 | Hanei et al. | 363/41 |
| 4,851,982 | 7/1989 | Tanahashi | 363/37 |
| 5,307,258 | 4/1994 | Schidhauser | 363/98 |
| 5,631,819 | 5/1997 | Masaki et al. | 363/132 |
| 5,663,627 | 9/1997 | Ogawa | 363/132 |
| 5,699,240 | 12/1997 | Obayashi | 363/98 |

FOREIGN PATENT DOCUMENTS 0 585 703 A2   3/1994   European Pat. Off. .

*Primary Examiner*—Matthew Nguyen
*Attorney, Agent, or Firm*—Oblon, Spivak, McClelland, Maier & Neustadt, P.C.

[57] ABSTRACT

This invention relates to a device for measuring currents used in a converter (1) powered by a DC power source and equipped with six switches (T1, T2, T3, T4, T5, T6) associated with diodes (D1, D2, D3, D4, D5, D6) and controlled by a control circuit (2) and a microcontroller (3), and equipped with current sensors (Su, Sv, Sw) each located between the switch and the diode associated with a lower channel, and secondly the return conductor to the DC power source supplying "direct" signals (Isu, Isv, Isw) in phase with the currents (Ia, Ib, Ic) output from the converter, characterized by the fact that it includes means (A46, A62) of calculating an "indirect" replacement signal (Iai) equal to the sum of two "direct" signals (−Isu and −Isw) and a second "indirect" replacement signal (Ici) equal to the sum of the two "direct" signals (−Isu and −Isw) and means (Cu, Cw) for switching either a "direct" signal (Isu or Isw) or an "indirect" replacement signal (Iai or Ici) so as to send to the microcontroller (3) two signals reconstructed from the two phase currents (Ia* and Ic*), each composed of either the "direct" signal (Isu or Isw) or, during the PWM steps in which the lower branch transistor is not controlled, the "indirect" replacement signal (Iai, Ici).

7 Claims, 6 Drawing Sheets

1 U PHASE RECONSTRUCTED

1 W PHASE RECONSTRUCTED

Cu CONTROL     U PHASE DIRECT BRANCH

Cu CONTROL     U PHASE INDIRECT BRANCH

SET VALUE 50Hz

DEVICE FOR MEASURING CURRENTS IN A CONVERTER

BACKGROUND OF THE INVENTION

1. Field of the Invention

This invention relates to a device for measuring currents in a converter fitted with switches controlled by a control circuit and powered by a DC power source.

2. Discussion of Background

A frequency converter is used to control a motor at a variable frequency and voltage, from the AC network. This type of frequency converter consists of a DC power source (rectifier stage) that, after filtering, powers a voltage converter. The converter includes "switches" (for example IGBT transistors) that are controlled by a control circuit with a microcontroller using a technique called pulse width modulation (or PWM) outputting a sequence of fixed amplitude width modulated pulses to the motor. Transistor closing instants are fixed by the intersections of a sinusoidal reference wave representing the output voltage from a phase and a triangular modulation wave.

In a frequency converter, it is necessary to measure the current in the phases in order to regulate the speed and to provide protection against overcurrents and short circuits. There are several methods of measuring the current. A first method is to place Hall effect sensors or shunts with insulating amplifiers directly on the phases. A second method consists of placing a single shunt on the return conductor to the DC power source and "reconstructing" output currents in the phases. A third method consists of placing three shunts on the lower arms of the converter and "reconstructing" the output currents in the phases, making use of the voltage measurements at the terminals of the three shunts.

Known measurement methods using three shunts in the lower branches are not fully satisfactory, particularly at high speed and in defluxed mode.

SUMMARY OF THE INVENTION

The purpose of this invention is to provide a device capable of simply, economically and completely reconstructing output currents in all converter operating cases, this device operating from three shunts or current sensors installed on the lower arms of the converter. This device does not require any galvanic isolation or complicated digital processing.

The current measurement device according to the invention is used on a converter powered by a DC power source and provided with six switches associated with diodes and controlled by a control circuit and a microcontroller and equipped with current sensors each placed between the switch and the diode associated with a lower channel, the return conductor to the DC power source supplying "direct" signals in phase with the converter output currents, and is characterized essentially by the fact that it comprises means of calculating an "indirect" replacement signal equal to the sum of the two "direct" signals and a second "indirect" replacement signal equal to the sum of the two "direct" signals and means for switching either a "direct" signal or an "indirect" replacement signal so as to send to the microcontroller two reconstructed signals of two phases each composed of either the "direct" signal or, during PWM steps in which the lower branch transistor is not controlled, the "indirect" replacement signal.

According to one characteristic, the means of switching "direct" signals or "indirect" signals are composed of switches controlled by a logic circuit receiving controls from transistors in the lower channels.

BRIEF DESCRIPTION OF THE DRAWINGS

The invention will now be described in more detail with reference to an embodiment given as an example and illustrated by the drawings in the appendix, in which.

DETAILED DESCRIPTION OF THE PREFERRED EMBODIMENT

Figure 1:
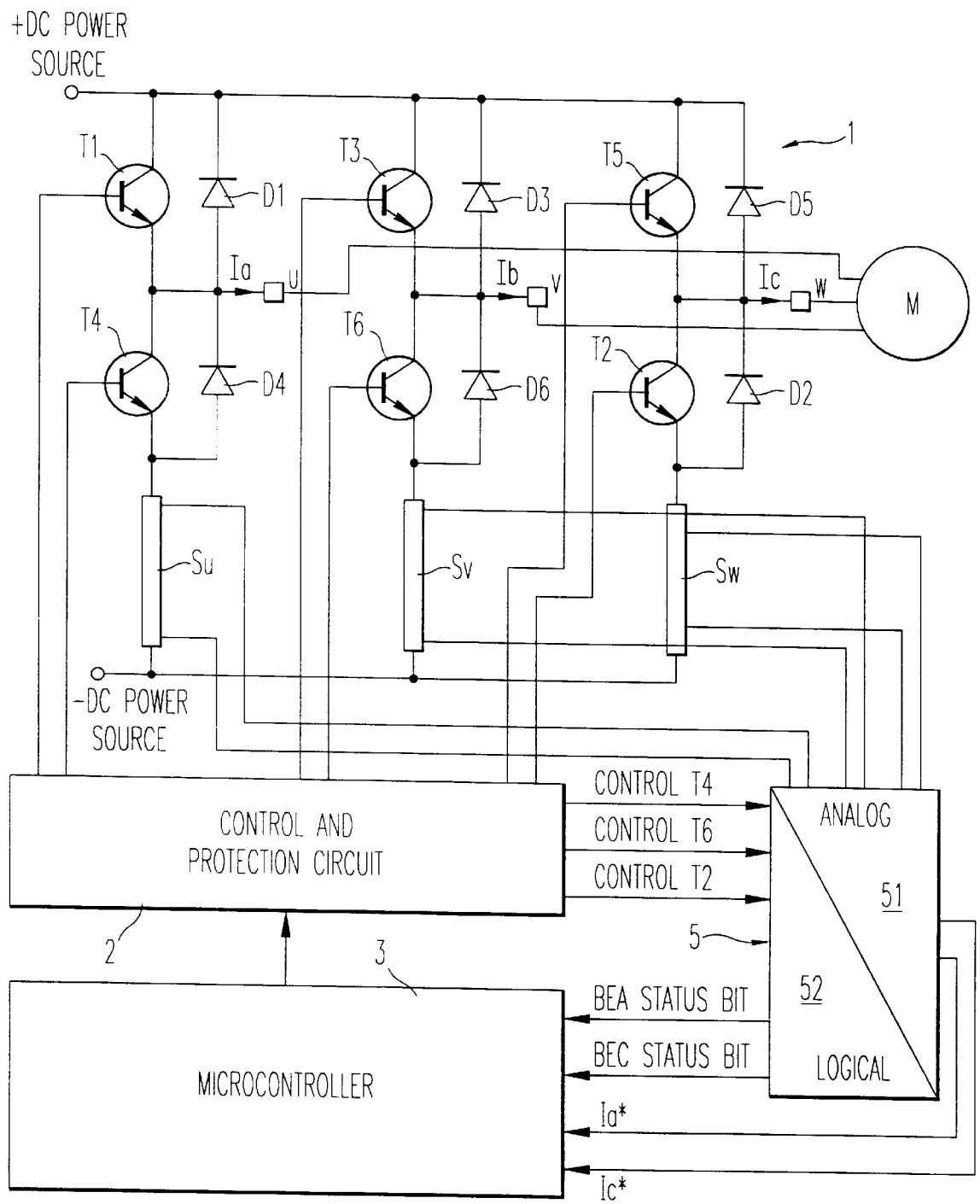
FIG. 1 is a diagram of a converter equipped with a current measurement device according to the invention.
Figure 2:
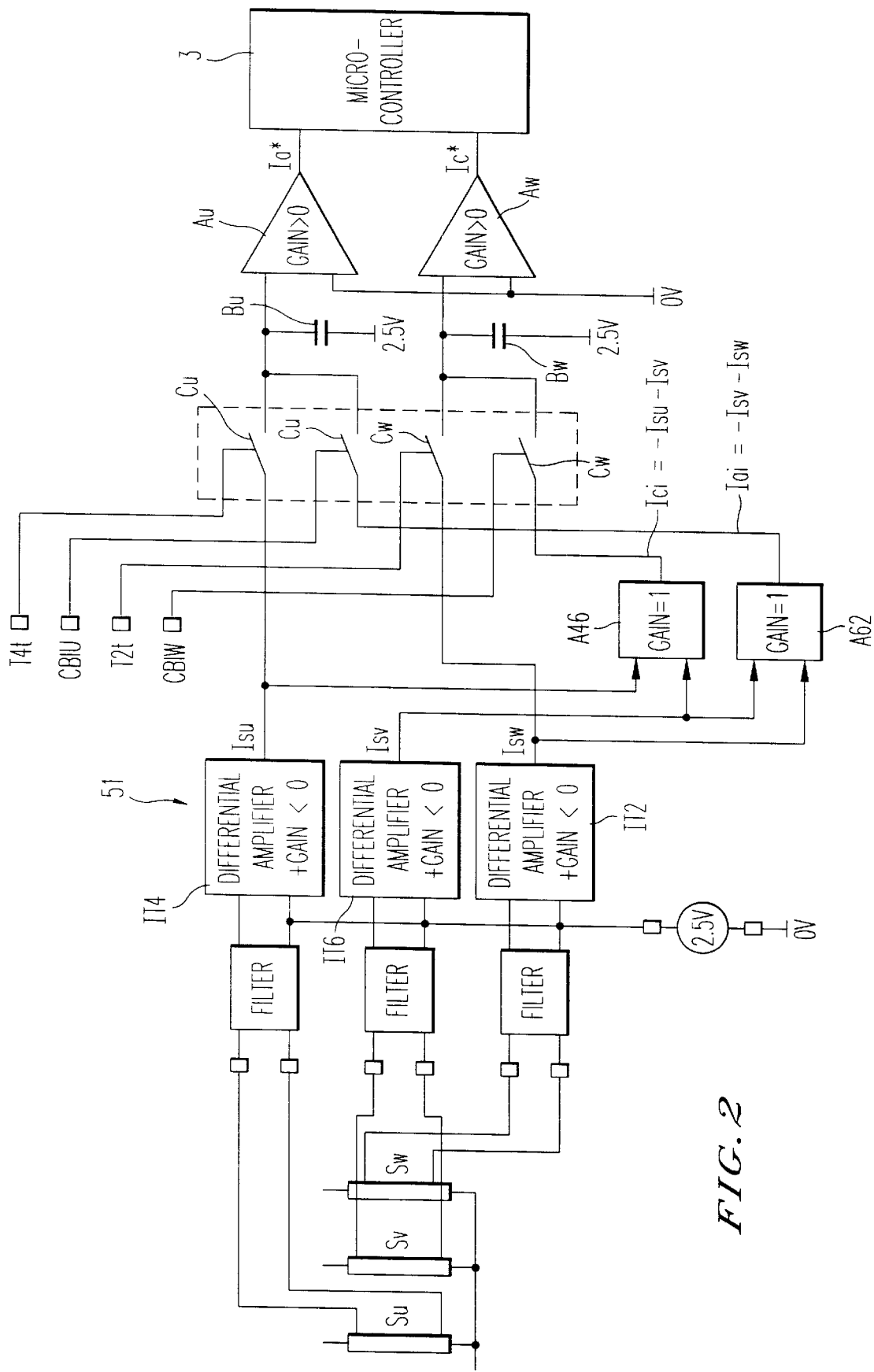
FIG. 2 is a functional diagram of the analog circuit used on the current measurement device.

FIG. 1 shows a voltage converter 1 equipped with the current measuring device according to the invention and powered at the positive and negative terminals of a DC power source.

This voltage converter 1 is equipped with "switches" T1 to T6, in this case IGBT type transistors, associated with diodes D1 to D6. Transistors T1 to T6 are controlled by a control circuit 2 and a microcontroller 3 so as to output a sequence of fixed amplitude pulses modulated in width (pulse width modulation or PWM). Referring to FIG. 4, it can be seen that the times at which transistors T1 to T6 close are determined by the intersections of a reference sine wave representing the output voltage from a phase, and a triangular modulation wave. The real currents are denoted Ia (U phase), Ib (V phase) and Ic (W phase).

The converter 1 comprises three shunts or current sensors Su, Sv, Sw that are each mounted between firstly a pair formed of a transistor and the free wheel diode associated with a lower channel, and secondly the return conductor to the DC power source. The sign of the voltage at the terminals of an Su or Sv or Sw shunt is opposite to the sign of the current that is passing through this shunt.

The voltages at the terminals of shunts Su, Sv, Sw are sent to an analog circuit 51 on a current reconstruction circuit 5. They are applied to filters and then to amplifiers IT4, IT6 and IT2 respectively. The Isu (U phase), Isv (V phase) and Isw (W phase) signals output from amplifiers IT4, IT6 and IT2 represent the images of phase currents Ia, Ib, Ic respectively. Amplifiers IR4, IT6, IT2 have a negative gain so that voltages Isu, Isv, Isw respectively can be put back into phase with the currents passing through the shunts.

It is considered that the motor M is balanced and consequently the sum of the real currents Ia, Ib and Ic is equal to 0.

Output signals Isu and Isv from amplifiers IT4 and IT6 are sent to an operational amplifier A46 that calculates the sum of currents –Isu–Isv, denoted Ici. Output signals Isv and Isw from amplifiers IT6 and IT2 are sent to an operational amplifier A62 that calculates the sum of currents –Isv –Isw, denoted Iai.

The output signal Isu from amplifier IT4 ("direct" branch) and the output signal Iai=–Isv–Isw from amplifier A62

("indirect" branch) are sent to a switch Cu that switches one of these signals onto a blocking circuit Bu. Furthermore, the output signal Isw from amplifier IT2 ("direct" branch) and the output signal Ici=−Isu−Isv from amplifier A46 ("indirect" branch) are sent to a switch Cw which switches one of these two circuits onto a blocking circuit Bw.

The function of the blocking circuits Bu and Bw is to hold the currents applied to switches Cu and Cw at their most recent value until the next control from switches Cu and Cw. Output amplifiers Au and Aw receive signals from blocking devices Bu and Bw and control the final level by supplying the signals Ia* and Ic* as outputs. These signals Ia* and Ic* are sent to the microcontroller 3 analog-digital converters.

The Ia*, Ib* and Ic* currents represent reconstructed currents, the real currents in the phases being denoted Ia, Ib, Ic. Ia* is the current reconstructed as a function of Isu and Iai. Ic* is the current reconstructed as a function of Isw and Ici.

Note that the system only reconstructs the two phase currents Ia* and Ic*, the third current being reconstructed in microcontroller 3. As a variant, it would have been possible to reconstruct Ib* instead of reconstructing Ia* and Ic* only.

Figure 3:
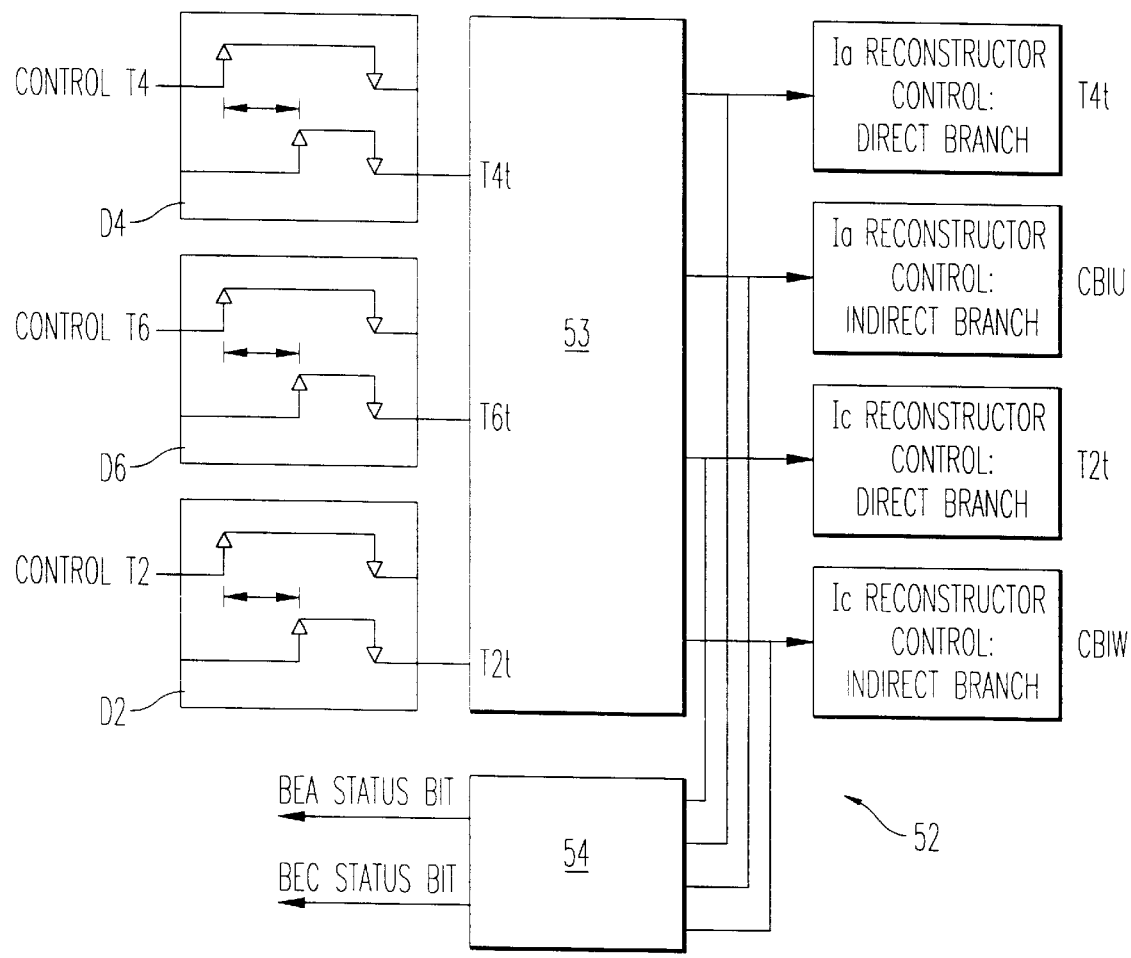
FIG. 3 is a functional diagram of the logic circuit used on the current reconstruction device.
Figure 4A:
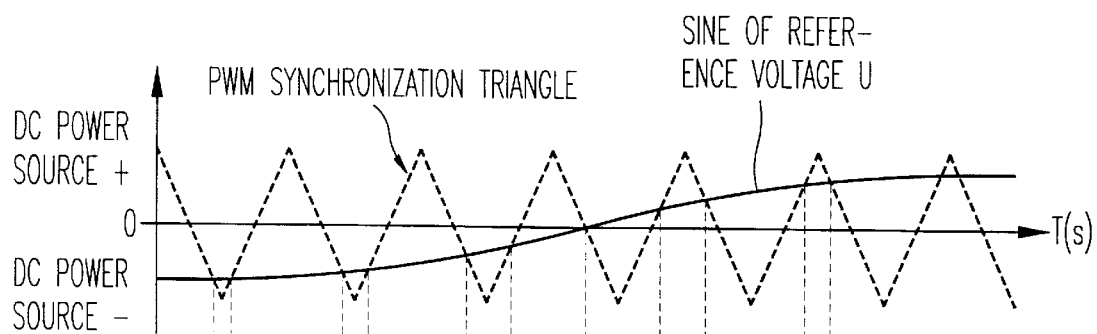
FIG. 4 is a diagram illustrating the sequencing of the current reconstruction.
Figure 4B:
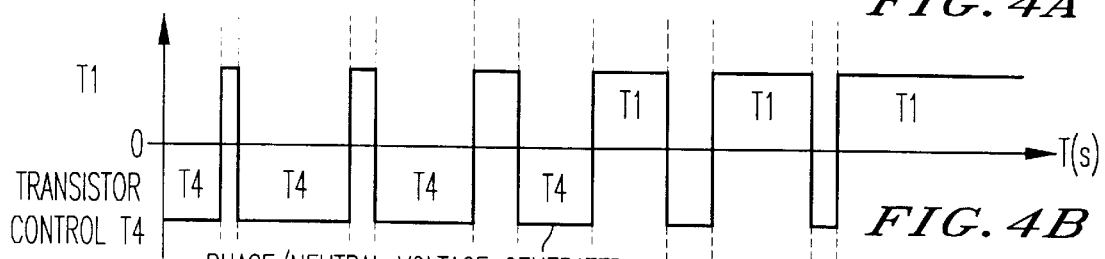
Figure 4C:
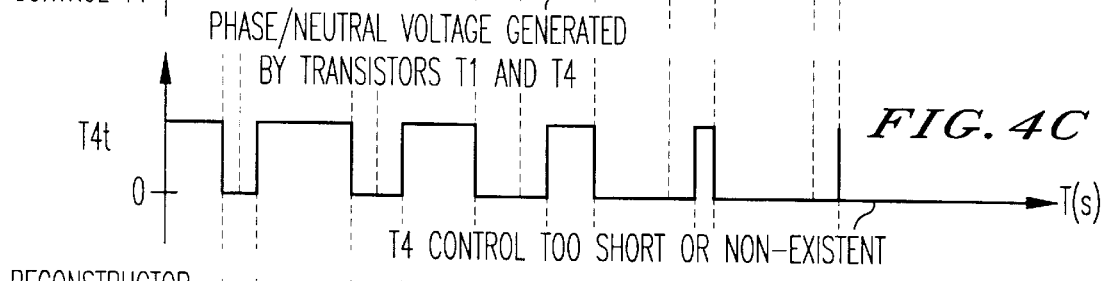
Figure 4D:
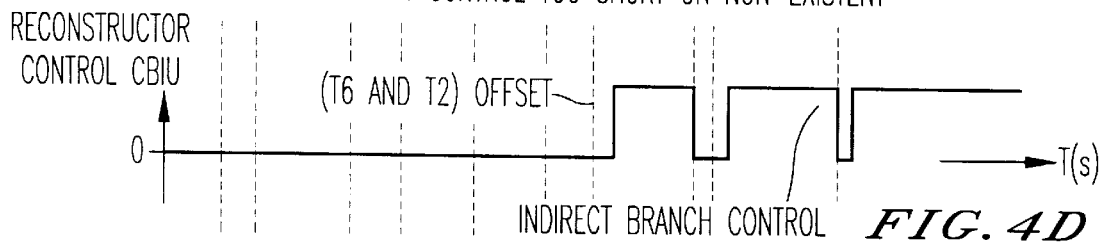
Figure 4E:
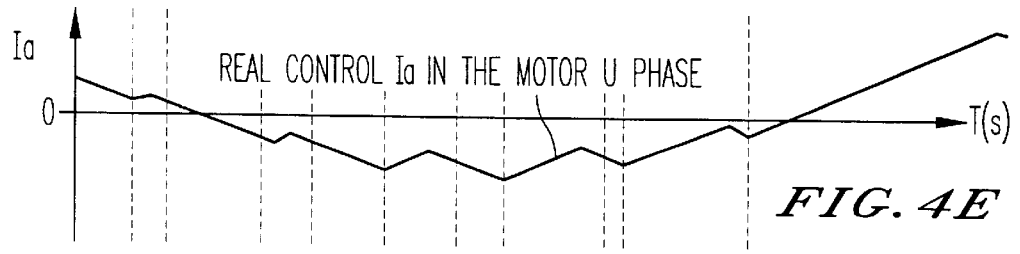
Figure 4F:
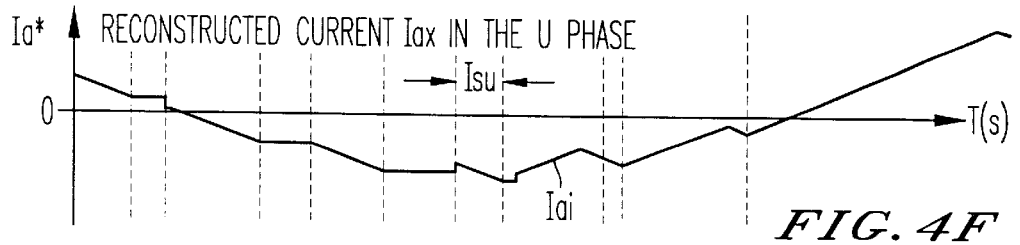
Figure 5A:
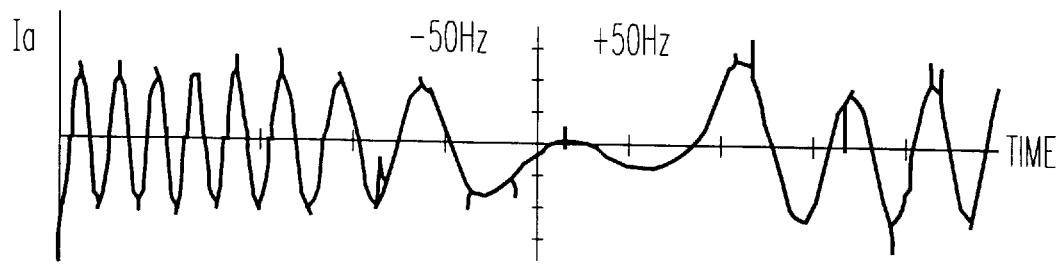
FIGS. 5–5d comparatively illustrate the real current and the reconstructed current in the U phase (FIGS. 5a and 5b) and in the W phase (FIGS. 5c and 5d)
Figure 5B:
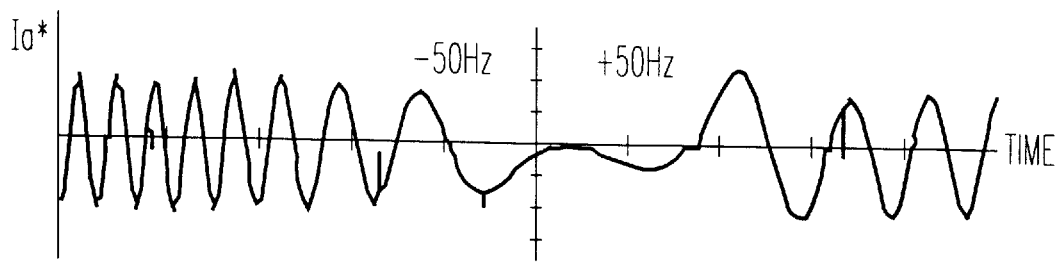
Figure 5C:
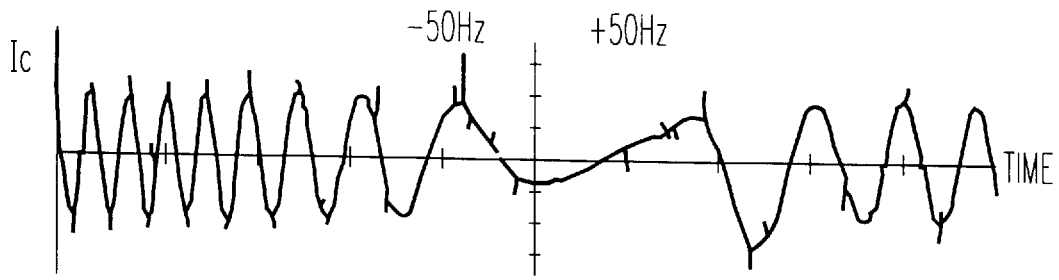
Figure 5D:
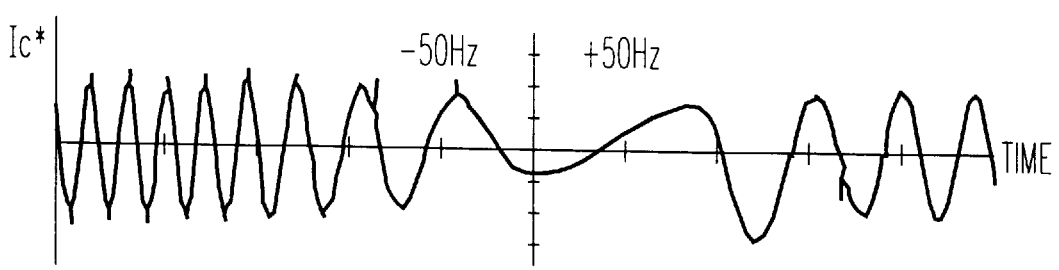
Figure 6A:
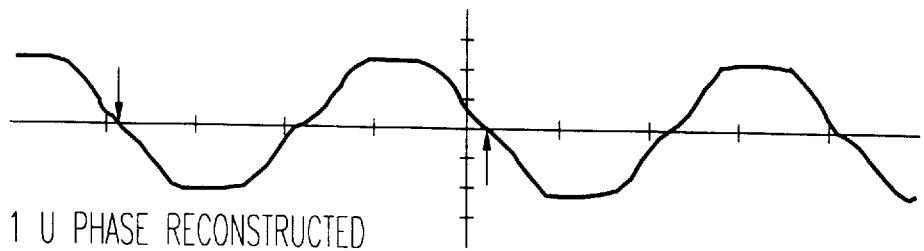
FIG. 6 illustrates the controls of the direct branch and the indirect branch of the device.
Figure 6B:
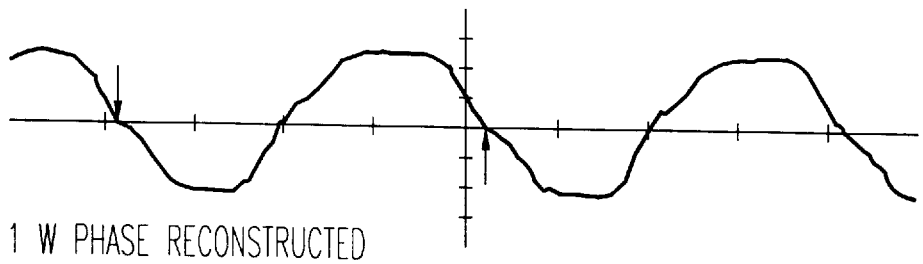
Figure 6C:
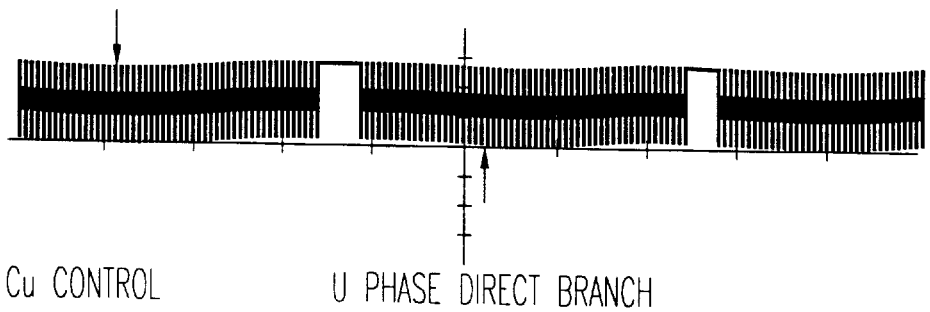
Figure 6D:
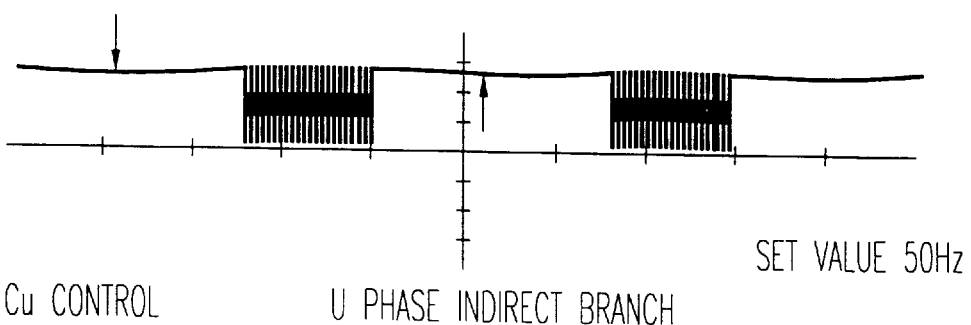

The switches Cu and Cw that control the direct or indirect branch connection of the reconstruction circuit 5 are controlled by a control logic circuit 52 represented diagrammatically in FIG. 3.

It is considered that the control from a transistor T4 or T6 or T2 is at logical level 1 when the said transistor is conducting, and that the same control is at logical level 0 when the said transistor is not conducting.

The logic circuit 52 is controlled by controls from transistors T4, T6 and T2. It comprises three offsetting circuits D4, D6, D2 that offset the rising front of controls from transistors T4, T6 and T2, the falling front being synchronous with the transistor control. The outputs from these offsetting circuits are denoted T4t, T6t and T2t respectively. T4t is the Cu control for the direct branch that reconstructs the current Ia*. T2t is the Cw control for the direct branch that reconstructs current Ic*.

The T4t, T6t and T2t controls are processed in a logic circuit 53 that outputs the T4t, CBIU, T2t and CBIW controls.

The CBIU control is active when there is no T4t signal and the T6t and T2t signals are at logical level 1. Circuit 53 then activates the Cu indirect control to reconstruct the current Ia*. The CBIW control is active when there is no T2t signal and when the T4t and T6t signals are at logical level 1. Circuit 53 then activates the Cw indirect control to reconstruct current Ic*.

If none of the transistors is controlled, then the T4t and T2t controls are set to level 1 to make the Ia* and Ic* signals stable.

A circuit 54 sends two bits BEA and BEC to the microcontroller 3, which inform this microcontroller 3 of the state of the reconstructor for each of the measured phases. It comprises two bistable elements that change direction when logic circuit 52 switches from direct branch to the indirect branch. The microcontroller 3 reads these BEA and BEC bits as soon as an Ia* or Ic* current measurement is made by its analog/digital converters in order to correct the offset relative either to the direct branch or to the indirect branch. These offset values can be determined by calibration.

We will now describe operation of the device.

When the frequency converter is switched on, it is calibrated to take account of the fact that signals output from a direct branch or an indirect branch are processed by different amplifier systems, since the amplifier offsets (amplifier balancing) are different. Four offset values for the direct and indirect branches for the two phases are stored in the device memory. One of these values is added to the Ia* or Ic* current measurement depending on the value of the corresponding status bit BEA or BEC of the reconstructor 5.

When a transistor-diode pair in a lower branch, for example T4-D4, is cut and after the interchannel delay, the corresponding upper channel pair, T1-D1 in this case is controlled. The reconstructor is then blind and the current is blocked by blockers Bu and Bw at the level reached just before the lower channel was cut off.

In some cases, the current is zero in the lower channel of the converter for several PWM steps. The direct branch of the reconstructor cannot be used, and the indirect branch of the reconstructor is then used. These cases occur at high speed when the current is positive in the phase considered, and transistor T1, T3 and T5 in the upper channel is controlled.

When the current in the U phase is positive for several PWM steps, the other two phases are compulsorily negative and it is possible to replace the current Isu by the current Iai=−Isv−Isw. When the current in the W phase is positive during several PWM steps, the other two phases are necessarily negative, and it is possible to replace the current Isw by the current Ici=−Isu−Isv.

Each time that the T4t control is active, the reconstruction circuit 5 outputs the current originating from the direct branch U, to the microcontroller 3. Each time that the CBIU control is active, the reconstruction circuit 5 supplies the signal output from the indirect branch, namely Iai=−Isv−Isw, to the microcontroller 3.

Each time that the T2t control is active, the reconstruction circuit 5 outputs the current originating from the direct branch W, to the microcontroller 3. Each time that the CBIW control is active, the reconstruction circuit 5 supplies the signal output from the indirect branch, namely Ici=−Isu−Isv, to the microcontroller 3.

We have seen above that the replacement value Iai=−Isv−Isw is supplied at the output from amplifier A62 (indirect branch) and that the replacement value Ici=−Isu−Isv is supplied to the output of amplifier A46 (indirect branch).

The following table summarizes the reconstruction type used ("direct" branch or "indirect" branch) and the current sent to the microcontroller 3, as a function of the state of the lower branch transistors T4, T6, T2.

| T4 T6 T2 | Case | Reconstruction U phase | Reconstruction W phase | Current Ia* in the U phase | Current Ic* in the W phase |
|---|---|---|---|---|---|
| 0 0 0 | 0 | Blocked | Blocked | Zero current | Zero current |
| 0 0 1 | 1 | Blocked | Direct C | ? | Isw |
| 0 1 1 | 3 | Indirect A | Direct C | −Isv − Isw = Iai | Isw |
| 0 1 0 | 2 | Blocked | Blocked | ? | ? |
| 1 1 0 | 6 | Direct A | Indirect C | Isu | −Isu − Isv = Ici |
| 1 0 0 | 4 | Direct A | Blocked | Isu | ? |
| 1 0 1 | 5 | Direct A | Direct C | Isu | Isw |
| 1 1 1 | 7 | Direct A | Direct C | Isu | Isw |

FIG. 4 shows operation of the reconstructor on the U phase, and represents the real current Ia and the "reconstructed" current Ia*.

Referring to FIG. 5, it can be seen that the two real currents Ia and Ic measured directly in the motor U and W phases and the two reconstructed currents Ia* and Ic* are very similar in the same U and W phases.

FIG. 6 shows that control of the switch of the indirect branch completes control of the switch of the direct branch when it is impossible to control the direct branch.

Obviously it would be possible to develop new variants and improvements to detail, or even consider the use of equivalent means, without going outside the scope of the invention.

We claim:

1. A device for measuring currents in a converter powered by a DC power source wherein said converter includes a group of switches associated with each one of a corresponding group of diodes wherein said switches include a first plurality of upper channel switches and a second plurality of lower channel switches and wherein said group of switches are controlled by a control circuit and a microcontroller, said device comprising:

a plurality of current sensors wherein each of said current sensors is positioned between one of said switches of said lower channel and an associated diode wherein said converter outputs a first plurality of phase currents;

means connected to said current sensors for providing a second plurality of currents which are images of said first plurality of phase currents;

calculating means responsive to said second plurality of currents to provide a third plurality of currents wherein each of said third plurality of currents is produced as a result of the addition of two of said second plurality of currents;

means for switching wherein said means for switching receives said second plurality of currents and said third plurality of currents and switches either said second plurality or said third plurality of currents to provide two reconstructed signals wherein each of said reconstructed signals includes either one of said second plurality of currents or one of said third plurality of current wherein said switching means operates as a function of the control of said lower channel switches.

2. Device according to claim 1, wherein the means of switching includes switches controlled by a logic circuit receiving controls from the lower channel transistors.

3. Device according to claim 1 characterized by the fact that it comprises a circuit sending information signals to the microcontroller.

4. Device according to claim 1 characterized by the fact that it includes blockers after the switches.

5. Device according to claim 2, characterized by the fact that it comprises a circuit sending information signals to the microcontroller.

6. Device according to claim 2, characterized by the fact that it includes blockers after the means for switching.

7. Device according to claim 3, characterized by the fact that it includes blockers after the means for switching.

* * * * *